United States Patent [19]

Broeske

[11] Patent Number: 4,706,328

[45] Date of Patent: Nov. 17, 1987

[54] PIVOTED CASTER WHEEL AND YOKE BRAKE HAVING A DETENT

[75] Inventor: Jeffrey J. Broeske, Richfield, Wis.

[73] Assignee: E. R. Wagner Mfg. Company, Hustisford, Wis.

[21] Appl. No.: 856,024

[22] Filed: Apr. 25, 1986

[51] Int. Cl.⁴ .............................................. B60B 33/00
[52] U.S. Cl. ..................................... 16/35 R; 188/1.12
[58] Field of Search ........................ 16/35 R; 188/1.12

[56] References Cited

U.S. PATENT DOCUMENTS

| | | | |
|---|---|---|---|
| 2,081,594 | 5/1937 | McIntosh | 16/35 R |
| 2,484,094 | 10/1949 | Jackson | 16/35 R |
| 2,494,696 | 1/1950 | Forbes | 16/35 R |
| 2,709,828 | 6/1955 | Noelting et al. | 16/35 R |
| 3,162,888 | 12/1964 | Mobus | 16/35 R |
| 3,388,419 | 6/1968 | Crawford | 16/35 R |
| 3,571,842 | 3/1971 | Fricke | 16/35 R |
| 3,828,392 | 8/1974 | Bolger | 16/35 R |
| 3,881,216 | 5/1975 | Fontana | 16/35 R |
| 3,890,669 | 6/1975 | Reinhards | 16/35 R |
| 4,035,864 | 7/1977 | Schroder | 16/35 R |
| 4,348,784 | 9/1982 | Fontana | 16/21 X |
| 4,449,268 | 5/1984 | Schnuell | 16/35 R |

Primary Examiner—Fred Silverberg
Attorney, Agent, or Firm—Michael, Best & Friedrich

[57] ABSTRACT

An improved caster construction wherein a brake is provided for selectively braking both the wheel against rotation and the yoke against rotation around the axis of the post of the caster. The post includes a lower end having a nut fixed thereto and the brake includes a brake plate having a socket for selectively engaging the nut to prevent rotation of the yoke about the axis of the post.

10 Claims, 7 Drawing Figures

PIVOTED CASTER WHEEL AND YOKE BRAKE HAVING A DETENT

FIELD OF THE INVENTION

The invention relates to casters and more particularly to brake or locking mechanisms for casters and for braking the wheels of the casters and for locking the casters to prevent rotation of the casters about a vertical axis.

BACKGROUND PRIOR ART

In many applications for casters it is desirable that a caster include means for braking the wheel of the caster against rotation and means for simultaneously braking the caster yoke against rotation about the axis of the caster post.

An example of such a prior art caster is illustrated in the Schnuell U.S. Pat. No. 4,449,268, issued May 22, 1984 Another example of a prior art caster construction is illustrated in the Bolger U.S. Pat. No. 3,828,392, issued Aug. 13, 1974.

Attention is also directed to the Fontana U.S. Pat. No. 4,348,784, issued Sept. 14, 1982; the Forbes U.S. Pat. No. 2,494,696, issued Jan. 17, 1950; the Reinhards U.S. Pat. No. 3,890,669, issued June 24, 1975; the Jackson U.S. Pat. No. 2,484,094, issued Oct. 11, 1949; and the Crawford U.S. Pat. No. 3,388,419, issued June 18, 1968.

Attention is further directed to the Noelting et al. U.S. Pat. No. 2,709,828, issued June 7, 1955; the Fricke U.S. Pat. No. 3,571,842, issued Mar. 23, 1971; the Schroder U.S. Pat. No. 4,035,864, issued July 19, 1977; the McIntosch U.S. Pat. No. 2,081,594, issued May 25, 1937; the Mobus U.S. Pat. No. 3,162,888, issued Dec. 29, 1964 and the Fontana U.S. Pat. No. 3,881,216, issued May 6, 1975.

SUMMARY OF THE INVENTION

The present invention provides an improved caster construction wherein there is an improved means for braking the caster wheel and an improved means for preventing rotation of the caster yoke and wheel around the axis of the post of the caster.

More particularly, the invention includes a caster having a support member for supporting a load, the support member including a lower end portion having a nut fixedly secured thereon, a yoke including a pair of parallel downwardly extending parallel arms, and a wheel housed between the parallel arms and supported for rotation. Means are also provided for rotatably joining the yoke to the support member for rotation about a vertical axis. Means are further provided for selectively braking the wheel, this means including a brake member supported by the yoke for pivotal movement between a disengaged position and a braking position, the brake member being supported for pivotal movement intermediate its opposite ends. One end of the brake member includes an aperture defining a socket selectively engageable with a nut fixed to the lower end of the support member. That end of the brake member is movable between a disengaged position wherein the brake member socket is spaced from the lower end of the support member and a second position wherein the socket surrounds the nut to prevent rotation of the support member with respect to the brake member.

In one form of the invention the other end of the brake member is movable between a disengaged position and a wheel braking position.

In one form of the invention means are further provided for causing movement of the brake member from the disengaged position to the engaged position, the means for causing movement of the brake member including a brake lever having opposite ends and supported for pivotal movement about the axis of rotation of the wheel between a brake engaging position and a brake release position. Means are also provided for joining the brake lever to the brake member, that means including a connecting member having one end joined to the brake lever and an upper end engageable with the brake member. The upper end of the connecting member includes a first portion engaging an upper surface of the opposite end of the brake member when the brake member is moved to the wheel engaging position and for applying a force on the upper surface of the other end of the brake member to hold that end of said brake member against the wheel. A second portion engages a lower portion of the opposite end of the brake member when the brake lever is moved to a brake disengaged position and pushes the opposite end of the brake member away from the wheel.

In one embodiment of the invention the other end of the brake member includes a detent for housing the first portion of the connecting member when the brake lever is moved to the brake engaging position.

One of the specific features or advantages of the invention is that the movable brake member provides a relatively simple mechanism for locking both the wheel and the yoke, while also providing a secure means for restraining the yoke against rotation. The engagement of the brake plate and the lower end of the post is like the engagement of a wrench or socket with a nut and provides a high strength mechanism for preventing rotation of the yoke with respect to the post or support structure.

Another of the advantages of this arrangement is that it is relatively inexpensive to manufacture or fabricate this brake structure. A nut can be threaded onto a lower end of the caster post and then staked so as to fix the nut on the caster post, and the aperture or socket can be formed in the brake plate by a stamping operation.

Another feature of the invention is the configuration of the end of the brake plate adapted to brake the wheel and the provision of detent means for holding the brake plate in a braking position or alternatively in a brake release position.

Various other features and advantages of the invention will be apparent by reference to the following description of a preferred embodiment, from the drawings and from the claims.

Figure 2:
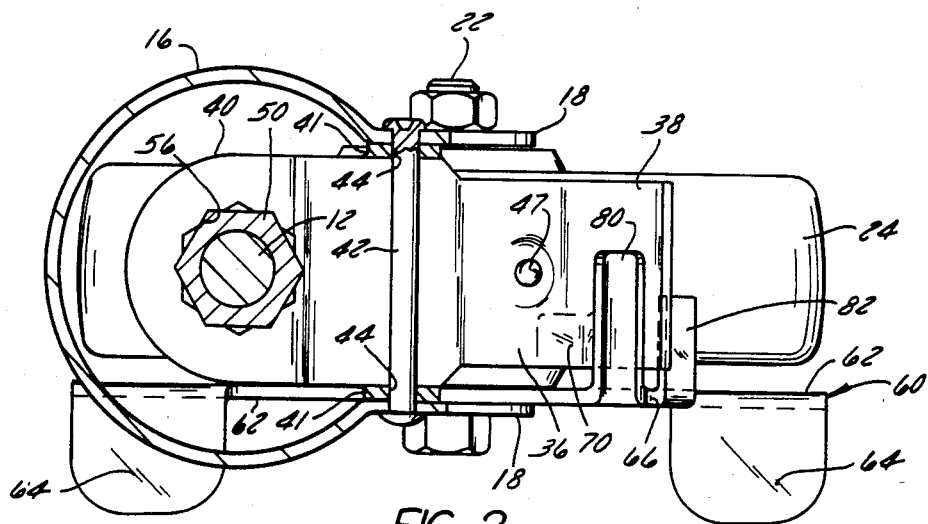
FIG. 2 is a plan view of the caster illustrated in FIG. 1.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 1:
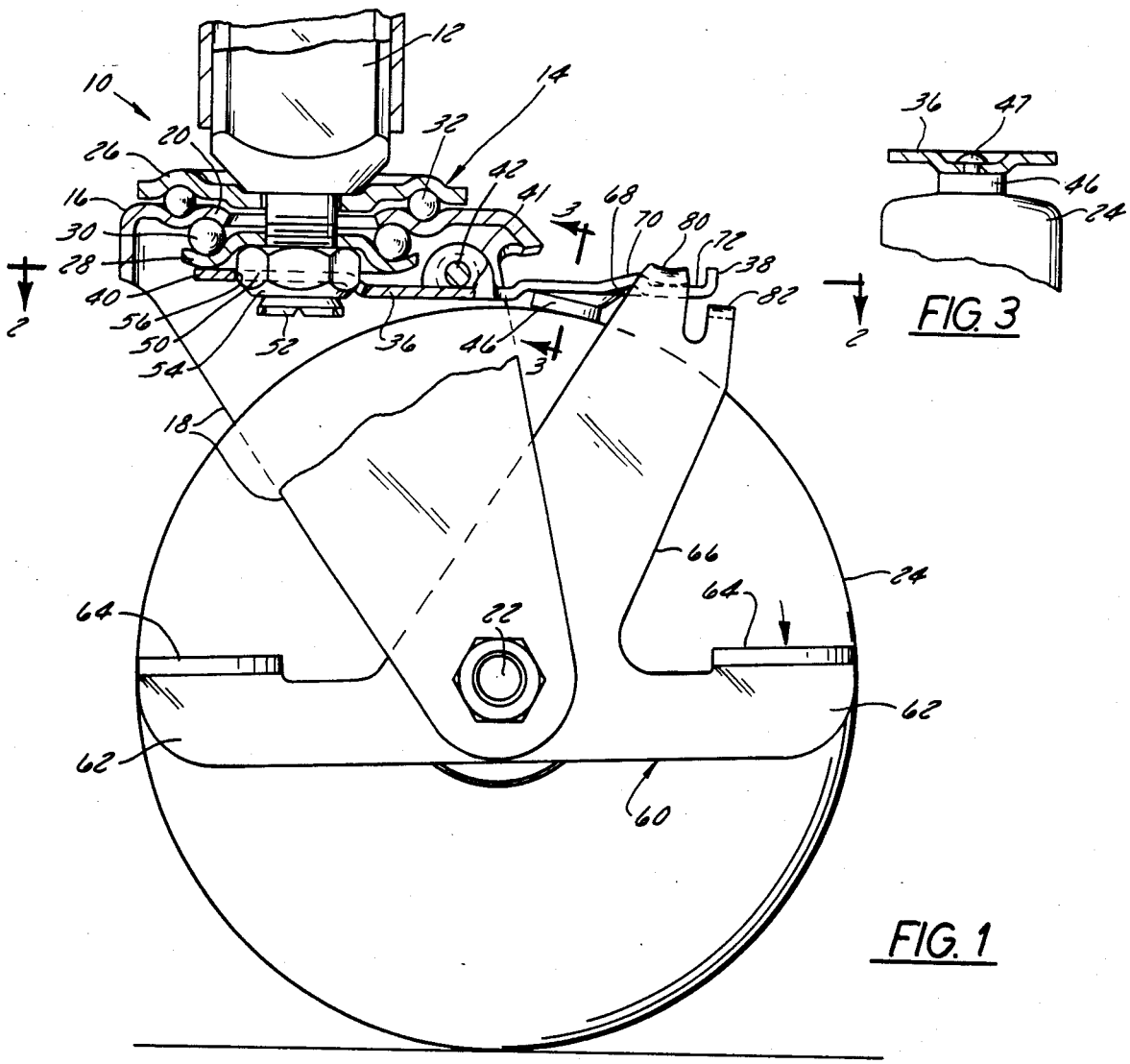
FIG. 1 is a side elevation view of a caster embodying the invention and with portions broken away.
Figure 3:
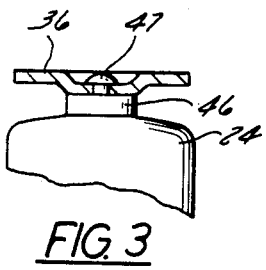
FIG. 3 is a partial cross section view taken along line 3—3 in FIG. 1.

Illustrated in FIG. 1 is a caster 10 embodying the invention and including a support member 12 adapted to support a load. While the support member 12 could have various configurations depending on the intended use of the caster and the load carried by the caster, in the illustrated arrangement it comprises a post or load supporting member supported by a bearing assembly 14, in turn, supported by a caster yoke 16. The caster yoke 16 is comprised of a pair of downwardly extending legs 18 joined at their upper ends by a horizontal plate or web 20. The lower ends of the legs of the yoke 16 support an axle 22 which, in turn, supports the caster wheel 24.

The bearing assembly 14 is comprised of a pair of spaced apart generally circular bearing races 26 and 28 which support the central vertical post 12 and are positioned above and below the web 20 of the yoke 16 to sandwich the web 20 therebetween. The upper surface of the lower race 28 defines a circular bearing surface surrounding the vertical axis of the central vertical post and is adapted to support a plurality of ball bearings 30 engageable with a circular bearing race defined by the lower surface of the web 20. The lower surface of the upper race 26 defines a second circular bearing surface surrounding the axis of the post 12 and for supporting the ball bearings 32 engageable with a circular bearing race defined by the upper surface of the web 20.

Means are further provided for selectively braking the wheel 24 against rotation about the axle 22 and for simultaneously preventing rotation of the caster 10 about the vertical axis of the post 12. The means for selectively braking includes a pivotable brake plate or brake member 36 pivotally supported by the yoke 16 above the wheel and positioned between the legs 18 of the yoke for limited pivotal movement about an axis parallel to the axis of rotation of the wheel. The brake plate 36 includes opposite ends, one end 38 including means for selectively engaging the periphery of the wheel 24 for locking the wheel against rotation. The opposite end 40 of the brake plate 36 includes means for selectively engaging the lower end of the post 12 to prevent relative movement of the brake plate 36 and the yoke 16 about the vertical axis of the post 12.

Referring more particularly to the construction of the brake plate illustrated in the drawings, it comprises a generally elongated plate or lever having a width somewhat less than the distance between the legs 18 of the yoke. The brake plate 36 includes a forward end 38 for engaging the wheel and a rearward end 40 for engaging the post. The brake plate is pivotably supported intermediate its opposite ends by a pair of upwardly extending flanges 41, and by a pivot pin 42. The pivot pin 42 is supported at its opposite ends by the upper ends of the legs 18 of the yoke, and the flanges 41 include aligned bores 44 for housing opposite ends of the pin 42 and such that the brake plate is supported by the pin 42 for pivotal movement about an axis parallel to the axis of the wheel 24. The pivot pin 42 is located above the periphery of the wheel 24 and in forwardly spaced relation from the vertical pivot axis of the yoke 16 such that the end of the brake plate 36 adapted to engage the post 12 can move upwardly into engagement with the post 12 when the opposite end 38 of the brake plate moves downwardly into braking engagement with the periphery of the wheel 24.

The brake plate 36 also includes means for frictionally engaging the periphery of the wheel 24 to prevent the wheel from rotating. In the illustrated arrangement, this means includes a cylindrical metal button 46 secured to the lower surface of the forward portion 38 of the brake plate 36 by a rivet 47.

The lower end of the post 12 projects downwardly through the bearing races 26 and 28 and web 20 and has a configuration particularly adapted to be engaged by the end 40 of the brake plate 36 to prohibit rotation of the caster yoke 16 with respect to the post 12. More particularly, in the illustrated arrangement a hexagonal nut 50 is mounted or threaded onto the lower end of the post 12, and the post is staked at 52 such that the nut 50 is rigidly fixed to the post. In the illustrated arrangement, the periphery of the lower portion of the nut also includes a bevelled or chamfered surface 54.

Figure 4:
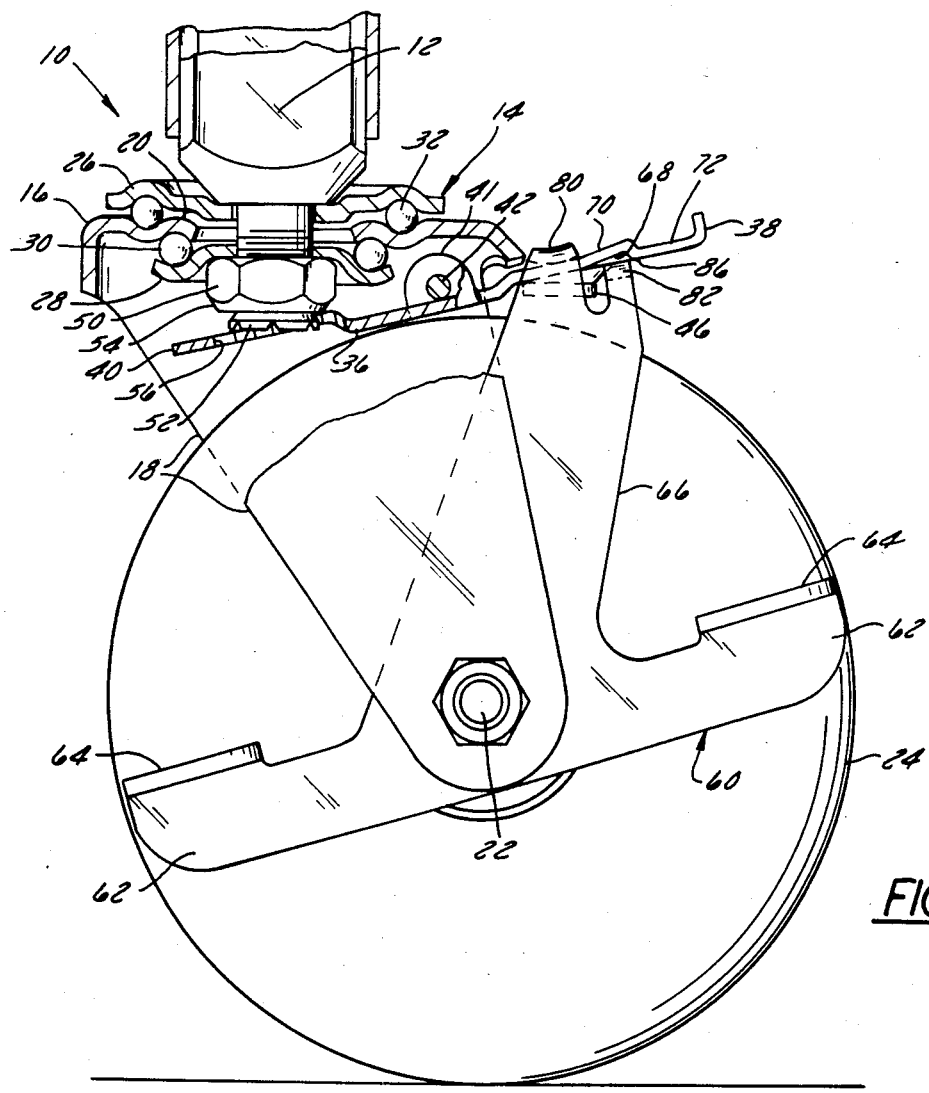
FIG. 4 is a view similar to FIG. 1 and showing the brake member in a brake release position.

The end 40 of the brake plate adapted to selectively engage the post 12 includes a polygonal aperture 56 defining a socket, and that end 40 of the brake plate can be moved from a disengaged position shown in FIG. 4 where it is spaced from the end of the post 12 to an engaged position shown in FIG. 1 where the socket 56 surrounds the nut 50 such that the brake plate 36 cannot rotate with respect to the post 12.

The means for braking also includes means for causing pivotal movement of the brake plate 36 between the disengaged position shown in FIG. 1 and the braking position shown in FIG. 4. This means for causing pivotal movement of the brake plate includes a brake lever 60 supported by the axle 22 for pivotal movement about the axis of rotation of the wheel 24. The brake lever 60 includes opposed lever arms 62 including flanges or tabs 64 to permit an operator to push downwardly on a selected one of the opposite ends of the brake lever 60. A brake plate engaging arm or connecting member 66 extends upwardly and forwardly from a central portion of the brake lever 60 and includes an upper end adapted to engage the forward portion 38 of the brake plate. The brake plate engaging arm 66 is integrally joined to the brake lever 60 such that pivotal movement of the brake lever 60 in the clockwise direction as shown in FIG. 1 will cause forward movement of the upper end of the brake plate engaging arm 66.

Figure 5:
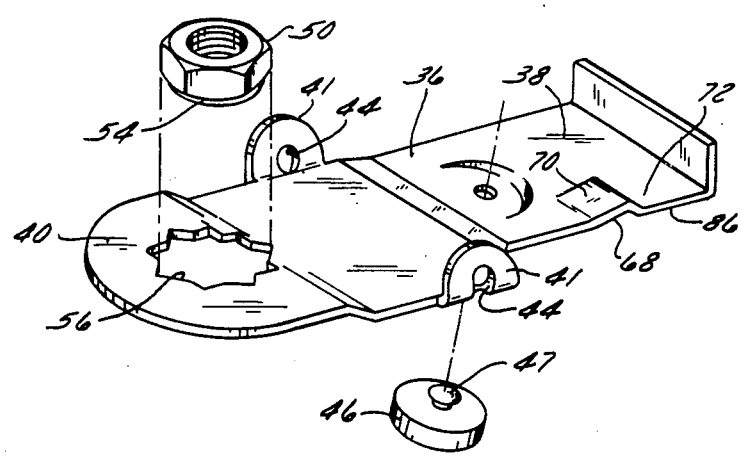
FIG. 5 is an exploded perspective view of a brake member embodied in the caster illustrated in FIGS. 1-4.

The forward end 38 of the brake plate 36 also includes a portion defining a raised detent 68 best shown in FIG. 5. The detent 68 includes an upper surface 70 having a portion sloping upwardly and forwardly to a crest and a portion sloping sharply downwardly and forwardly to a land portion 72 of the detent.

The upper end of the brake plate engaging arm includes a first finger 80 adapted to selectively engage the surface 70 of the detent at the forward end of the brake plate 36 to force the wheel engaging button 46 of the brake plate down against the periphery of the wheel 24. The first finger 80 is integrally joined to the upper end of the brake plate engaging arm 66 and extends transversely thereto to extend over the forward end 38 of the brake plate.

The upper end of the brake plate engaging arm 66 also includes a second finger 82 located below the forward end 38 of the brake plate and adapted to selectively engage the lower surface 86 of the forward end 38 of the brake plate to force the brake plate 36 to a disengaged position.

In operation, when the forward brake pad 64 is depressed to cause movement of the brake plate engaging arm 66 forwardly to an engaging position, the first finger 80 will move forwardly with respect to the wheel 24 over the detent 68 of the brake plate 36 and will be releaseably restrained in a forward position (FIG. 1) because of engagement of the rearward portion of the first finger 80 with the forward surface of the detent 68.

When the rearward brake pad 64 is depressed to release the brake, the first finger 80 will move rearwardly over the detent 68, and the second finger 82 will engage the lower surface 86 of the forward end 38 of the brake plate 36 thereby pushing the forward end of the brake plate upwardly away from the wheel and moving the brake plate 36 to the disengaged position.

One of the features or advantages of the invention is that the brake plate included in the caster embodying the invention provides a relatively simple mechanism for locking both the wheel and the yoke while also providing a secure means for restraining the yoke against rotation.

Figure 7:
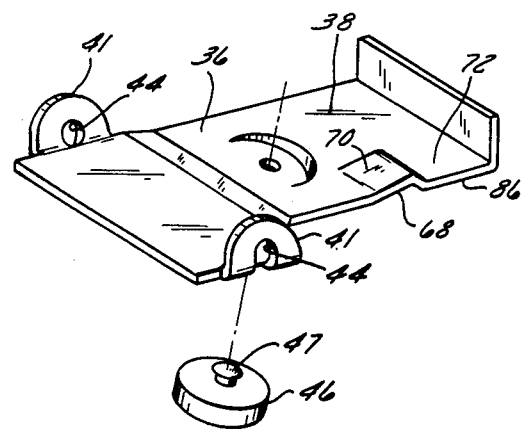
FIG. 7 is an exploded perspective view of a brake member embodied in the caster shown in FIG. 6.
Figure 6:
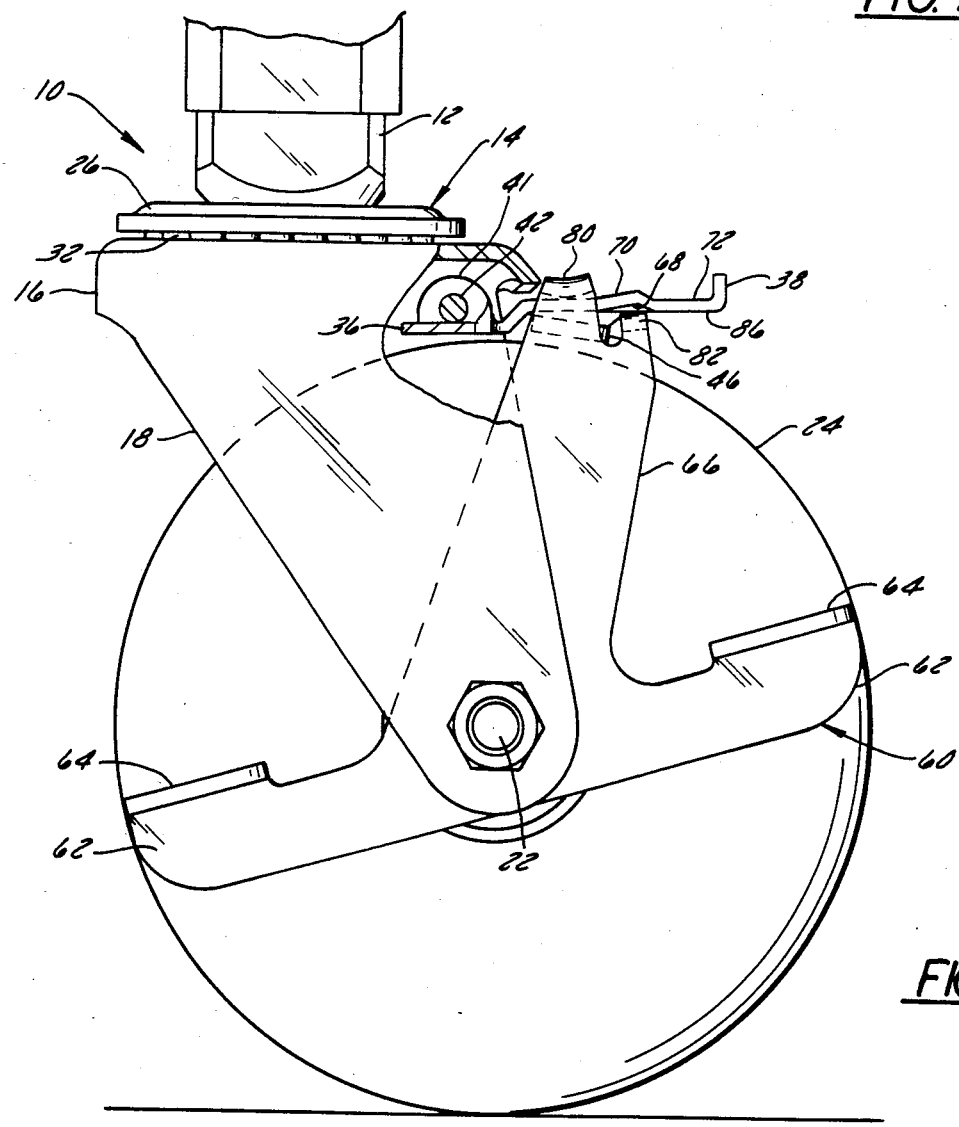
FIG. 6 is a view similar to FIG. 4 and showing an alternative embodiment of the invention.

Illustrated in FIGS. 6 and 7 is an alternative embodiment of the invention wherein means are provided for braking the wheel for rotation and wherein the caster is freely rotatable about the central longitudinal axis of the caster. The means for braking comprises a brake plate similar to that illustrated in FIGS. 1-5 but wherein the rearward end of the brake plate is deleted and the brake plate does not selectively engage the central post to preclude rotation of the caster.

Various features of the invention are set forth in the following claims.

I claim:
1. A caster comprising:
   a support member having a central longitudinal axis and adapted to support a load, said support member including a lower end portion, said lower end portion of said support member including a periphery having a plurality of substantially flat surfaces,
   a yoke including a pair of generally parallel downwardly extending parallel arms,
   a wheel housed between said generally parallel arms and supported for rotation by the generally parallel arms about a first axis,
   means for rotatably joining said yoke to said support member for rotation about a second axis, and
   means for selectively braking said wheel against rotation about said first axis and said yoke against rotation about said second axis, said means for braking including
   a brake member supported by said yoke for pivotal movement between a disengaged position and a braking position, the brake member including opposite ends and being supported for pivotal movement intermediate said opposite ends,
   one of said opposite ends of said brake member including an aperture, said one of said opposite ends of said brake member being movable between a disengaged position wherein said one of said opposite ends of said brake member is spaced from said lower end of said support member and a second position wherein said lower end portion of said support member is housed in said aperture, said aperture having a configuration for engaging said lower end of said support member such that said one of said opposite ends of said brake member prevents rotation of said support member with respect to said brake member said aperture defining a socket being complementary in shape to said lower end portion and being adapted to house said lower end portion of said support member when said brake member is moved to said braking position.

2. A caster as set forth in claim 1 wherein said other of said opposite ends of said brake member is movable between a disengaged position and a wheel engaging position wherein said wheel is prevented from rotating about said axis of rotation.

3. A caster as set forth in claim 1 and further including means for causing movement of said brake member from said disengaged position to said braking position, said means for causing movement of said brake member including a brake lever having opposite ends and supported for pivotal movement about said axis of rotation of said wheel between a brake engaging position and a brake release position, and means for joining said brake lever to said brake member, said means for joining including a connecting member having one end joined to said brake lever and an upper end engageable with the other of said opposite ends of said brake member, said upper end of said connecting member including a first portion engaging an upper surface of said other of said opposite ends of said brake member when said brake lever is moved to said brake engaging position to hold said other of said opposite ends of said brake member against said wheel, and a second portion engaging a lower portion of said other of said opposite ends of said brake member when said brake lever is moved to said brake release position and for pushing said other of said opposite ends of said brake member away from said wheel.

4. A caster as set forth in claim 3 wherein said other of said opposite ends of said brake member includes a detent portion for engaging said first portion of said upper end of said connecting member when said brake lever is moved to said brake engaging position for releasably holding said brake member in said braking position.

5. A caster comprising:
   a support member having a central longitudinal axis and being adapted to support a load,
   a yoke including a pair of parallel downwardly extending parallel arms,
   a wheel housed between said parallel arms and supported for rotation by the parallel arms about a first axis,
   means for rotatably joining said yoke to said support member for rotation about a second axis,
   means for selectively braking said wheel against rotation about said first axis and said yoke against rotation about said second axis, said means for braking including
   a brake member supported by said yoke for pivotal movement between a disengaged position and a braking position, the brake member including opposite ends and said brake member being supported for pivotal movement intermediate said opposite ends, one of said opposite ends of said brake member including means for selectively engaging said lower end of said support member when said brake member is moved to said braking position to prevent rotation of said yoke about said second axis, the other of said opposite ends of said brake member being movable between a disengaged position and a wheel engaging position wherein said wheel is prevented from rotating about said axis of rotation, and means for causing movement of said brake member from said disengaged position to said engaged position, said means for causing movement of said brake member including a brake lever having opposite ends and supported for pivotal movement about said axis of rotation of said wheel between a brake engaging position and a brake release position, and means for slidably joining said brake lever to said brake member, said means for slidably joining including a connecting member having one end joined to said brake lever and an upper end slidably engageable with said brake member, said upper end of said connecting member including a first portion slidably engaging an upper surface of said other of said opposite ends of said brake member when said brake member is moved to said wheel engaging position to hold said other of said opposite ends of said brake member against said wheel, and a second portion slidably engaging a lower portion of said other of said opposite ends of said brake member when said brake lever is moved to a brake disengaged position and for pushing said other of said opposite ends of said brake member away from said wheel.

6. A caster as set forth in claim 5 wherein said other of said opposite ends of said brake member includes a detent portion for releasably restraining said first portion of said connecting member in a braking position when said brake lever is moved to said brake engaging position.

7. A caster comprising:
a support member having a central longitudinal axis and being adapted to support a load,
a yoke including a pair of parallel downwardly extending parallel arms,
a wheel housed between said parallel arms and supported for rotation by the parallel arms about a first axis,
means for rotatably joining said yoke to said support member for rotation about a second axis,
means for selectively braking said wheel against rotation about said first axis, said means for braking including
a brake member supported by said yoke for pivotal movement between a disengaged position and a wheel engaging position wherein said wheel is prevented from rotating about said axis of rotation, and
means for causing movement of said brake member from said disengaged position to said wheel engaging position, said means for causing movement of said brake member including a brake lever having opposite ends and supported for pivotal movement about said axis of rotation of said wheel between a brake engaging position and a brake release position, and means for slidably joining said brake lever to said brake member, said means for slidably joining including a connecting member having one end joined to said brake lever and an upper end slidably engageable with said brake member, said upper end of said connecting member including a first portion selectively slidably engageable with an upper surface portion of said brake member when said brake member is moved to said wheel engaging position to hold said brake member against said wheel, and a second portion selectively slidably engageable with a lower portion of said brake member when said brake lever is moved to a brake disengaged position and for pushing said brake member away from said wheel.

8. A caster as set forth in claim 7 wherein said brake member includes a detent portion for releasably restraining said first portion of said connecting member in a braking position when said brake lever is moved to said brake engaging position.

9. A caster as set forth in claim 8 wherein said detent portion comprises a projection extending from said upper surface portion of said brake member, and said first portion of said upper end of said connecting member being engageable with said projection as said brake member is moved from said disengaged position to said wheel engaging position.

10. A caster as set forth in claim 7 wherein said connecting member is integrally joined to said brake lever.

* * * * *